(12) United States Patent
Cutsinger et al.

(10) Patent No.: US 9,785,303 B2
(45) Date of Patent: *Oct. 10, 2017

(54) SCENARIO SPECIALIZATION OF FILE BROWSER

(71) Applicant: MICROSOFT TECHNOLOGY LICENSING, LLC, Redmond, WA (US)

(72) Inventors: Paul Cutsinger, Redmond, WA (US); Cornelis K. Van Dok, Bellevue, WA (US); David G. De Vorchik, Seattle, WA (US); Eli Y. Tamanaha, Lynnwood, WA (US); Kenneth M. Tubbs, Bellevue, WA (US); Lyon K. F. Wong, Issquah, WA (US); Paul Gusmorino, Seattle, WA (US); Sasanka Chalivendra, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 764 days.

This patent is subject to a terminal disclaimer.

(21) Appl. No.: 13/953,174

(22) Filed: Jul. 29, 2013

(65) Prior Publication Data

US 2013/0311953 A1    Nov. 21, 2013

Related U.S. Application Data

(63) Continuation of application No. 11/111,984, filed on Apr. 22, 2005, now Pat. No. 8,522,154.

(51) Int. Cl.
*G06F 3/048* (2013.01)
*G06F 3/0481* (2013.01)
*G06F 17/30* (2006.01)

(52) U.S. Cl.
CPC ...... *G06F 3/0481* (2013.01); *G06F 17/30126* (2013.01)

(58) Field of Classification Search
None
See application file for complete search history.

(56) References Cited

U.S. PATENT DOCUMENTS

| 5,544,360 A | 8/1996 | Lewak et al. |
| 5,691,744 A | 11/1997 | Anstotz et al. |
(Continued)

FOREIGN PATENT DOCUMENTS

| EP | 1465060 A2 | 10/2004 |
| JP | 9114724 | 5/1997 |
(Continued)

OTHER PUBLICATIONS

Bott et al. (Bott), "Microsoft Windows XP inside Out", Microsoft press 2001, Chapter 11.*

(Continued)

*Primary Examiner* — Thanh Vu
(74) *Attorney, Agent, or Firm* — Aaron Chatterjee; Dan Choi; Micky Minhas

(57) ABSTRACT

In a graphical user interface environment, a situational-specific browser may be used to provide contextually appropriate levels of information for files whose information is to be displayed. As different views of files are to be displayed, the browser may dynamically adjust its configuration to display different types of information, features and/or command options. Different views may be predefined, or new views may be dynamically created in response to user navigation.

20 Claims, 7 Drawing Sheets

(56) References Cited

U.S. PATENT DOCUMENTS

| | | |
|---|---|---|
| 5,787,252 A | 7/1998 | Schettler et al. |
| 5,842,020 A | 11/1998 | Faustini |
| 5,844,554 A | 12/1998 | Geller et al. |
| 6,233,015 B1 | 5/2001 | Miller et al. |
| 6,310,648 B1 | 10/2001 | Miller et al. |
| 6,397,212 B1 | 5/2002 | Biffar |
| 6,401,101 B1 | 6/2002 | Britton et al. |
| 6,484,189 B1 | 11/2002 | Gerlach, Jr. et al. |
| 6,671,692 B1 | 12/2003 | Marpe et al. |
| 6,784,900 B1 | 8/2004 | Dobronsky et al. |
| 6,925,609 B1 | 8/2005 | Lucke |
| 6,966,033 B1 | 11/2005 | Gasser et al. |
| 6,990,498 B2 | 1/2006 | Fenton et al. |
| 7,010,755 B2 | 3/2006 | Anderson et al. |
| 7,080,328 B1 | 7/2006 | Sawyer |
| 7,203,737 B2 | 4/2007 | Starbuck et al. |
| 7,747,625 B2 | 6/2010 | Gargi et al. |
| 2002/0091691 A1 | 7/2002 | Sharp |
| 2002/0107973 A1 | 8/2002 | Lennon et al. |
| 2003/0001892 A1 | 1/2003 | Hartel et al. |
| 2003/0018624 A1 | 1/2003 | Hsiao et al. |
| 2003/0043191 A1 | 3/2003 | Tinsley et al. |
| 2003/0097410 A1 | 5/2003 | Atkins et al. |
| 2004/0032432 A1 | 2/2004 | Baynger |
| 2004/0215657 A1 | 10/2004 | Drucker et al. |
| 2005/0086239 A1 | 4/2005 | Swann et al. |

FOREIGN PATENT DOCUMENTS

| | | |
|---|---|---|
| JP | 3303926 | 7/2002 |
| WO | 0184377 A2 | 11/2001 |

OTHER PUBLICATIONS

Kodak Digital Science DC210 Plus Zoom/DC200 Cameras, a User Guide, Published 1998, 91 pages, ftp://ftp.kodak.com/web/service/manuals/dc210Plus.pdf—saved to 164891.

Weitlaner, Erwin, Metadata Visualisation, in Master's Thesis of Graz University of Technology, Dec. 1999, pp. 1-111 http://ftp.iicm.tugraz.at/pub/theses/eweit.pdt.

Office Action Issued in European Patent Application No. 05784292A, Mailed Date: Dec. 10, 2015, 5 pages.

Notice of Allowance dated Jan. 29, 2016 in U.S. Appl. No. 12/569,370, 8 pages.

The Prospero File System A Global File System Based on the Virtual System Model—Computing systems, vol. 5. No. 4, May 1992, Neuman, B. Clifford, 26 pages.

\* cited by examiner

SCENARIO SPECIALIZATION OF FILE BROWSER

RELATED APPLICATIONS

This application is a continuation of and claims benefit of priority to U.S. patent application Ser. No. 11/111,984, filed on Apr. 22, 2005, which application is herein incorporated by reference.

TECHNICAL FIELD

The present application relates generally to the field of computer software. More particularly, the application relates to a system and method for providing an improved user interface when browsing files on a computer system. The application relates to the display of information regarding such files, and for allowing user interaction with this information.

BACKGROUND OF THE INVENTION

To the relief of trees everywhere, the proliferation of digital documents has rendered paper documents obsolete in many situations. Digital technology has made it easy to duplicate and distribute digital versions of what used to be reams and reams of paper filed in countless filing cabinets. While the technology for capturing these documents has changed dramatically over the years, the approach to organizing them and retrieving them generally has not.

Today, file systems still use the traditional concept of filing cabinets and folders in organizing data, where files are logically "placed" in one of the folders on the system. Browsing for these files is just as archaic, and still resembles manually rifling through a filing cabinet full of paper documents. A file is considered to be stored in just one folder location, and the user is forced to look through a number of folders and subfolders to peruse the documents that are on the computer system. Additionally, the browsing interface provided to the user is static, and largely ignorant of the significance of the data being displayed. This ignorance and static browsing capabilities limits the amount of information provided to the user, and tends to complicate and prolong the user's efforts at browsing for files in the system.

For example, FIG. 2 shows an example of a browser panel 201 offered in the MICROSOFT WINDOWS XP® operating system. The panel 201 shows the contents of a folder (C:\Folder), which contains a number of subfolders and files, and includes the folder address 202, the names 203 of the various elements shown, their size 204, their type 205, and their date of modification 206. The layout of panel 201 is the same regardless of the contents being displayed, even if the panel's layout would result in an inefficient display. For example, the system shows a blank for the size of the two subfolders, but if "C:\Folder" contained only subfolders, the browser panel 201 would still display the "Size" column 204, with an entire column of blank entries. This column of blanks would still occupy the same width allotted to the Size column 204 in the panel's display format, and may well force certain more meaningful information off of the current display area.

Today's computer systems are being presented with more and more digital files to manage, and there is an ever-present need to improve the efficiency and clarity with which file information is give to the user as the user browses the files on the system. Prior browsers, such as panel 201, have room for improvement in this area, and such improvements are described below.

SUMMARY OF THE INVENTION

Aspects of the present invention may meet one or more of the above needs, and overcome one or more deficiencies in the prior art, by providing a system and method in which the user is given an improved file browsing interface.

The browsing interface may vary depending on the contents to be displayed. In some instances, the browsing interface may customize the user interface options presented in the browser panel in accordance with the contents to be displayed. The browser may rearrange, remove, and/or add displayed properties in accordance with the contents. Other aspects of the browser's features, appearance, and/or organization may be customized based on the contents.

One or more templates may be provided and/or created to provide a predetermined set of criteria for generating a browser panel.

Software interfaces may be provided to allow development of additional browser panels by users and/or applications.

User interaction with such a browser may cause further alterations in the browser's appearance and/or functionality.

BRIEF DESCRIPTION OF THE DRAWINGS

Features of the applicants' system are described in detail below with reference to the attached drawing figures, wherein.

DETAILED DESCRIPTION OF THE INVENTION

The present invention relates to a system and method for providing an improved user experience when browsing files on a system. An exemplary operating environment for the present invention is described below.

Figure 1:
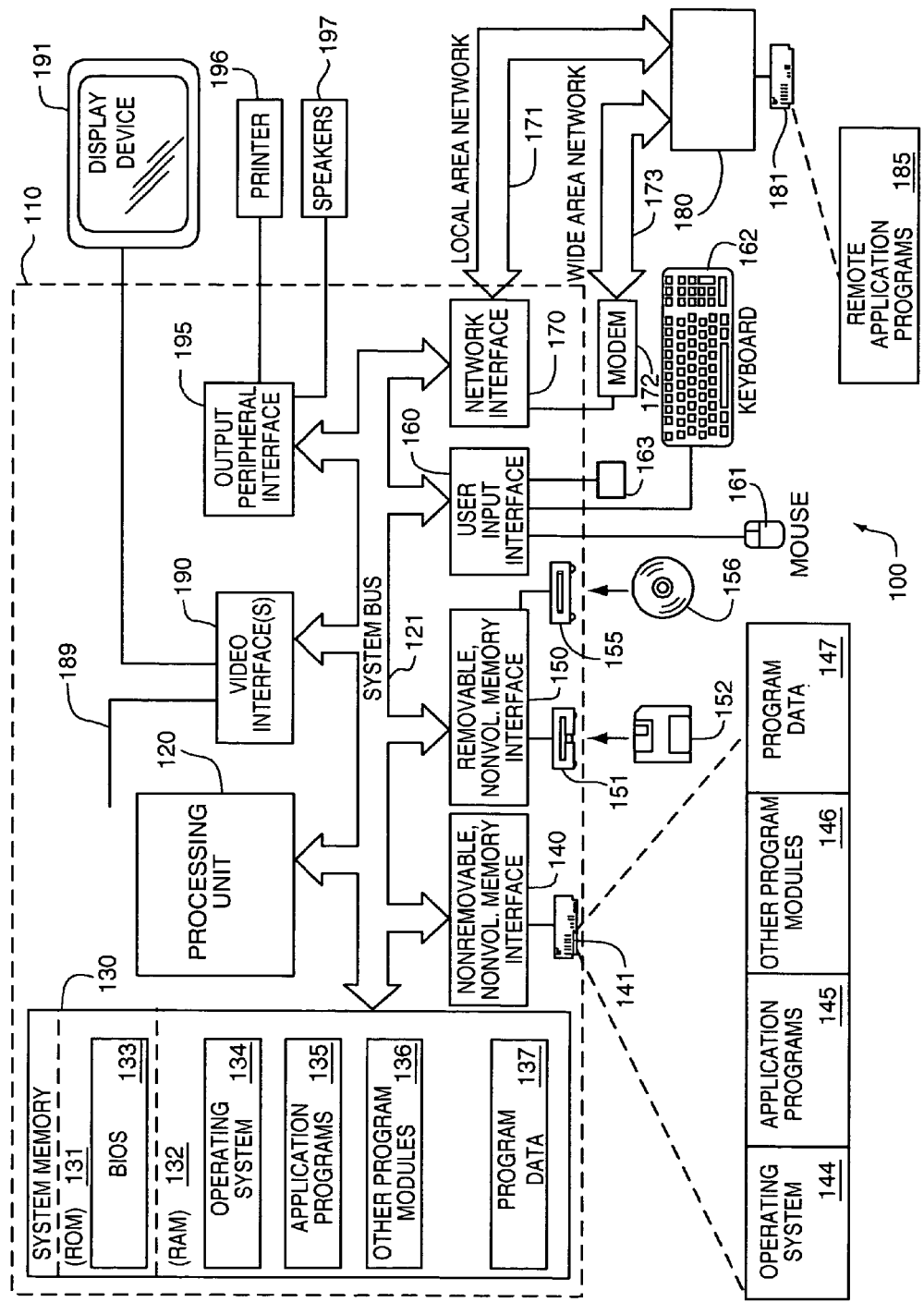
FIG. 1 is a block diagram of a computing-system environment suitable for use in implementing one or more features described herein.

Referring to the drawings in general and initially to FIG. 1 in particular, wherein like reference numerals identify like components in the various figures, an exemplary operating environment is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The features described herein may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the features may be practiced with a variety of computer-system configurations, including hand-held devices, multiprocessor systems, microprocessor-based or programmable-consumer electronics, minicomputers, mainframe computers, and the like. They may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 includes a general purpose computing device in the form of a computer 110 including a processing unit 120, a system memory 130, and a system bus 121 that couples various system components including the system memory 130 to the processing unit 120. If desired, any of the elements described herein may be implemented as standalone elements (e.g., a single processing unit), or as multiple elements working in concert (e.g., multiple processing units).

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/non-removable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Other internal components of the computer 110 are possible, but not shown. For example, various expansion cards such as television-tuner cards and network-interface cards may be incorporated within a computer 110.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

As previously mentioned, the features described herein may be described and implemented in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

Figure 2:
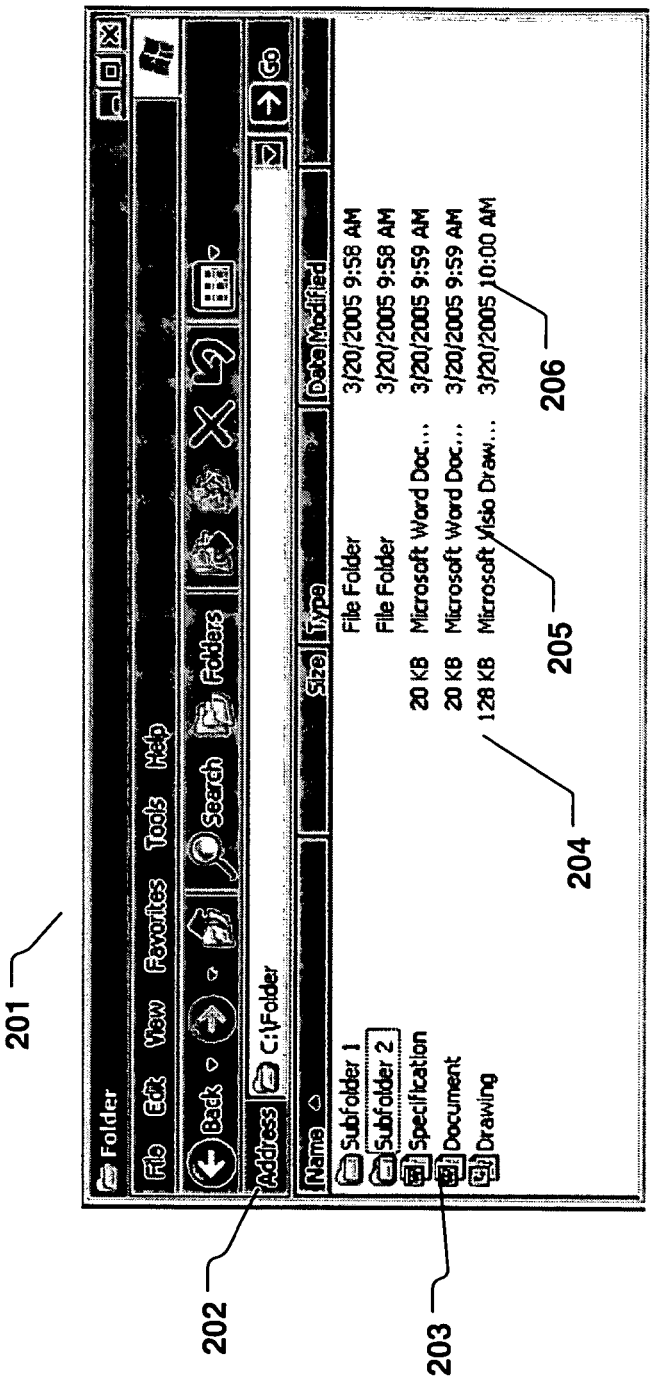
FIG. 2 is an example browser panel found in MICROSOFT WINDOWS XP®.

FIG. 2 has already been addressed above, and depicts a panel used in the MICROSOFT WINDOWS XP™ operating system to allow users to browse for files of all types (e.g., data, applications, etc.) available through the system.

Figure 3:
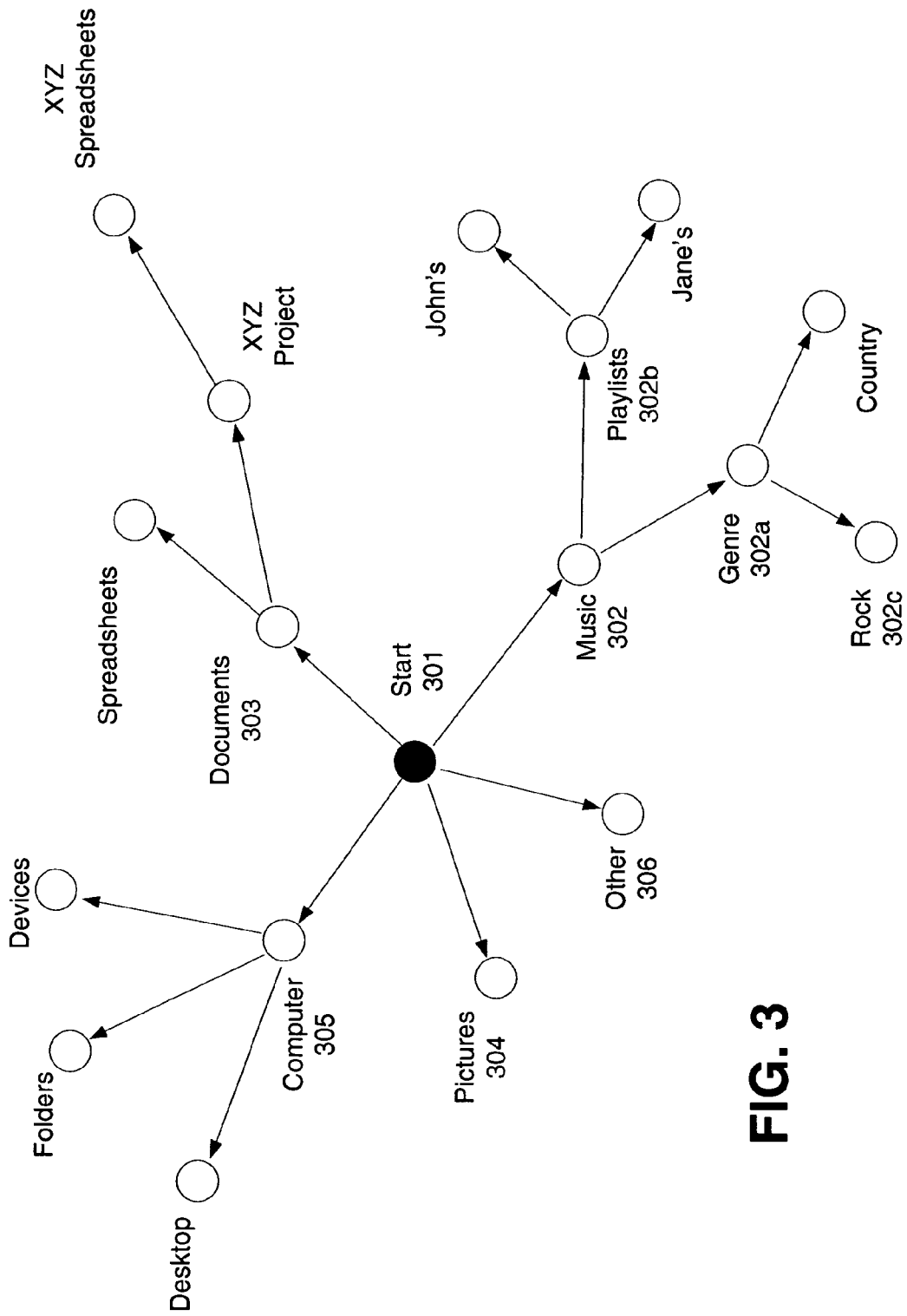
FIG. 3 is a diagram illustrating relationships between browser views.

FIG. 3 shows a relationship diagram illustrating how different panels, such as display regions, may be conceptually related. In some instances, there may be a Start panel 301 that may serve as an initial display region provided to the user to begin browsing through files available through the system. The Start panel 301 may offer the ability to view a different panel for browsing files, such as a Music browser 302, Documents browser 303, Pictures browser 304, Computer browser 305, or any other browser 306 desired by the system and/or user. Each of these browsers may be a top level panel for browsing through files that meet particular criteria. For example, Music browser 302 may display a listing of files on the system that meet certain music criteria, such as audio music file types. The browsers may also offer sub-browsers created using different criteria, such as a Genre 302a browser panel that displays files that meet one or more genre criteria; or a Playlist 302b browser panel that displays files relating to one or more playlists of songs. These panels may, in turn, allow the display of files meeting further criteria. For example, the Genre 302a panel might display a subset of music files that are songs having genre information, and may offer a Rock 302c sub-panel that displays a further subset of music files having a genre of rock and roll. Any number of panels may be created to accommodate any desired relationship and method of displaying file data. The Documents browser 303 may offer separate browsers for certain types of documents (e.g., spreadsheets), or documents pertaining to a given project (e.g., XYZ project).

Each available browser may be defined by a template stored in memory of the computer system. The template could simply be a file identifying the contents of the view, the organization, the features to display, etc. The template may also specify the actual files that are to be displayed in the browser view.

Figure 4:
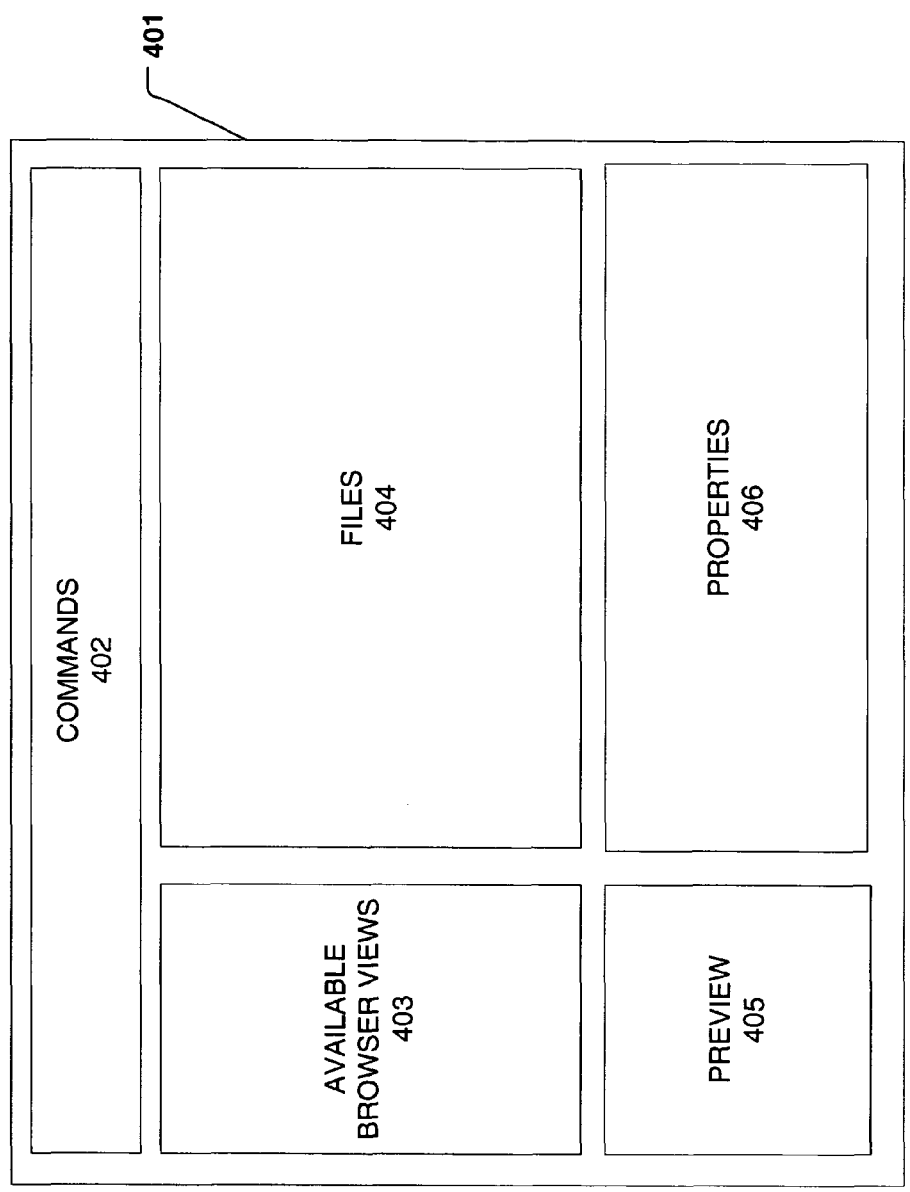
FIG. 4 depicts an example browser interface layout according to aspects of the present invention.

FIG. 4 depicts an example of a browser display 401. The display 401 may include one or more commands 402 offered to the user. The commands may be in any form of command entry, such as menus, links, buttons, icons, or other indicia, and may be custom selected based on the template establishing the browser view. For example, if the browser 401 is a display of music files, then the commands 402 may include specific commands that make sense for music files, such as "Copy to CD," "Play," and/or "Shop for Music Online." Of course, commands 402 may also include commands associated with and shared by various browsers, such as "File" commands for file manipulation (e.g., saving and opening files) and commands for editing the current panel (e.g., creating duplicate panels, or sorting multiple existing panels), and may include menus of commands. In addition to the presence/absence of commands, the commands display 402 may also customize the appearance of the display, such as its color, user interface element details (color, size, positioning, etc.), sequencing of selectable elements, etc.

Display 401 may include a list panel 403 showing the available browser panels. The list may include a listing of all available views on the system, which may be presented in a nested menu/sub-menu format to conserve display area. This range of views may be referred to as a pagespace. The list 403 may alternatively list a subset of browser panels that are associated with the current panel, resulting in a smaller pagespace. For example, if the current display 401 is a music panel, the list 403 may display Playlist and Genre view options, or specific playlists and/or genres that have their own panels.

Display 401 may include a files panel 404, which may contain a listing of the files that meet the criteria established for the current browser panel. The files panel 404 may include indicia representing data files (such as an icon and/or text), and one or more properties of the files (e.g., their names, authors, file sizes, file types, project affiliation, date of creation/modification, etc.). The properties may be arranged, such as in columns, and may be rearranged and/or modified depending on what is appropriate given the criteria used for the selected display 401. For example, a music browser might choose to list the "Song Title" as the first property, with "Artist" and "Album" next, whereas a browser for project XYZ might list the "Edit Date" first, with "File Size" and "File Type" to follow. Certain browser types may wish to omit undesired properties (e.g., the "Album" property may not be very useful for a spreadsheet document). Each browser display 401 may have a customized arrangement of files and associated properties. Column width, row size, indicia appearance (e.g., size, color, etc.), grouping, stacking, and any other display properties may be included in this customization. For example, some browsers may display their files as thumbnails (e.g., picture browsers may do this), while other browsers may simply display the files in a text listing of the files and their properties.

Display 401 may also include a preview panel 405 that provides a preview of the content of one or more selected files from the files panel 404. There may also be a properties panel 406 that displays properties for one or more selected files from the listview data 404. The properties panel 406 may provide greater detail and/or amounts of properties than that shown in listview 404. Display 401 may include other types of display and user interface elements as well, such as navigation commands, panel sizing commands, etc.

Each of the various portions of display 401 may be implemented as distinct software modules. For example, there may be a Commands module that is responsible for defining the user interface elements that are to go into Commands display 402, a Listview module for processing the display elements in the files panel 404, a Preview module for generating the content of the preview panel 405, etc. These modules may expose application program interface (API) elements to facilitate interoperability with other applications, and the various modules may be provided with parameters such as the criteria for a given view, its position, its size, etc. Having distinct modules may simplify the process of defining new panels with different layouts and arrangements.

Figure 5:
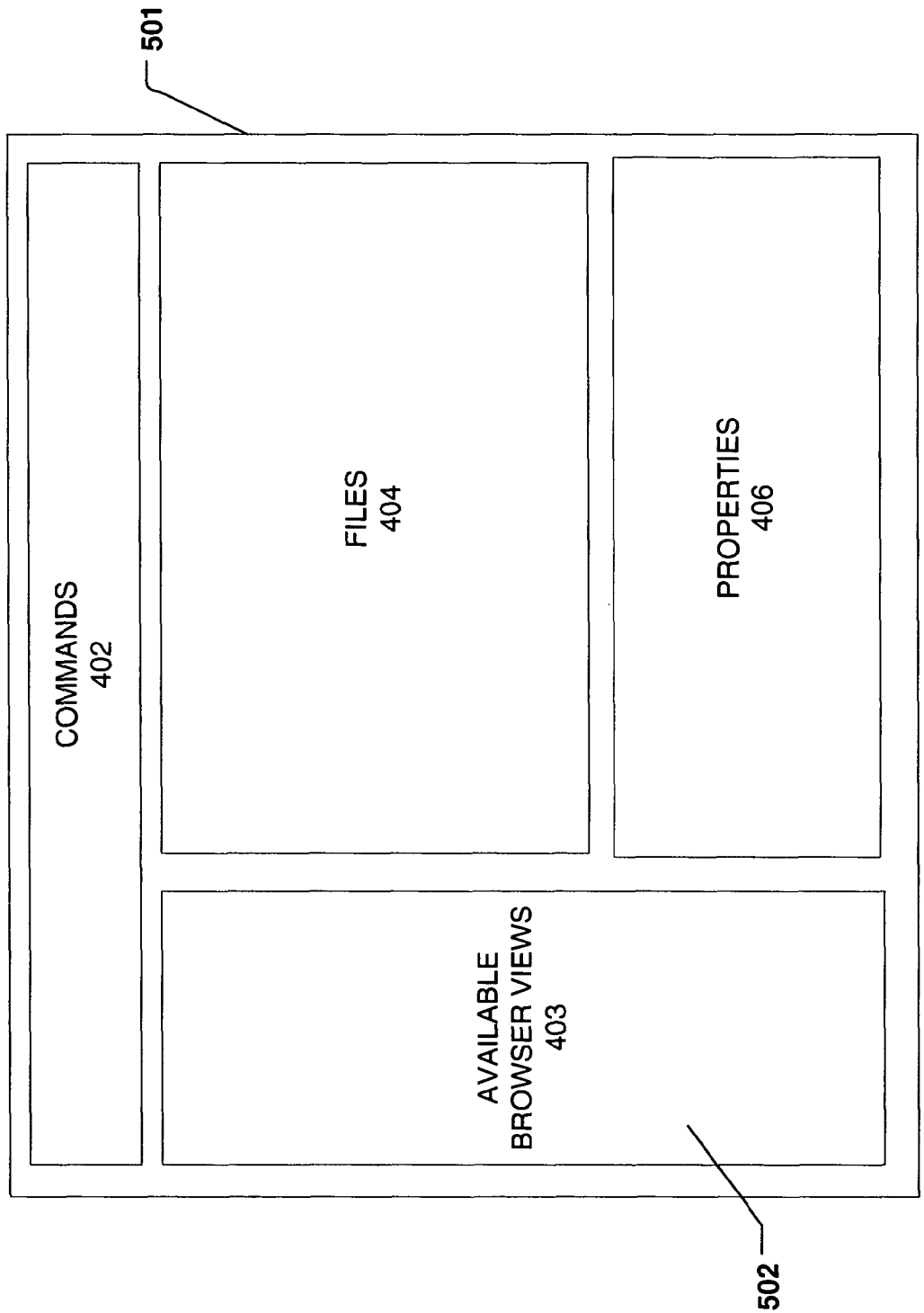
FIG. 5 depicts another example browser interface layout according to aspects of the present invention.

Each browser display 401 may also have differences beyond just having different contents in the display areas discussed above. For example, each browser may have its own customized arrangement of display areas, such that certain areas may be resized/added/removed based on the criteria and/or contents of the particular browser. For example, a music browser might wish to do away with preview panel 405, and offer music commands (e.g., play, pause, cue, add to playlist, burn to CD, etc.) in command area 402. The other display areas may be rearranged and/or resized to take advantage of the space previously occupied by the preview panel. The particular layout of the browser may be set, for example, in the template defining the browser view. For example, FIG. 5 depicts an example of a different browser 501 having elements arranged in a different manner. In that example, the list 502 of available browser views has been enlarged to occupy the space relinquished by the preview panel. As another difference, each browser view may have its own unique display theme, such as watermark pattern, color theme, font, etc., to help further distinguish the view from other views on the system. Context menus (e.g., available commands, text, etc.), user interface behaviors, default commands on left/right mouse clicks, and other display/interaction attributes may also be different for each browser.

Figure 6:
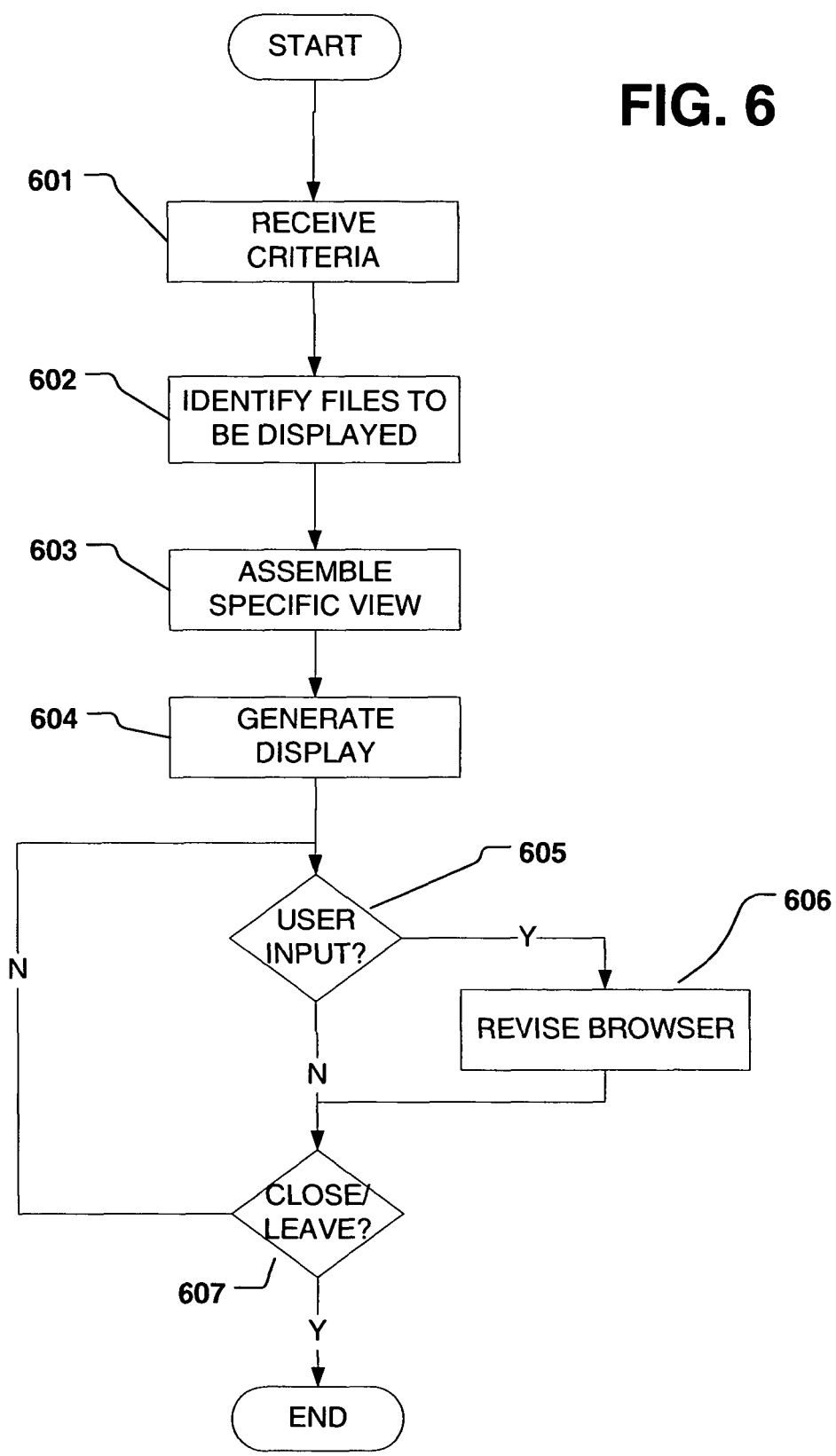
FIG. 6 depicts an example process for browsing files according to aspects of the present invention.

FIG. 6 depicts an example process by which various browsers may be displayed. In step 601, the system may receive one or more criteria defining a view to be displayed. These criteria may come from a variety of sources. For example, the user might have selected a predefined template for display, and the system may simply receive that selection (or the criteria associated with the template). Alternatively, the system may receive criteria for a new view, such as a new view based on a keyword search using keywords supplied by the user.

In step 602, the criteria may be used to identify the various files on the system that satisfy or meet the criteria, and which are to be included in the browser display. These files may be identified through a search of the system's memory, or they may simply be identified from the template information if the template already identifies the files to be listed.

When the files are identified, the system may assemble a specific browser view or panel in step 603. Assembling the panel may include consulting a predefined template to determine the various elements/modules that are needed in the panel. In some instances, the panel may be further customized and/or modified when the files identified for display satisfy a different set of criteria from the ones established for the template, or if the identified files are suitable for display in a different template that has narrower criteria. For example, if the user requests a browser for all files associated with a given project, such as XYZ Project, the system may be expected to provide a project browser panel. Such a panel may have been defined with the possibility that a project may include files of multiple types, and may have separate display regions to segregate files based on file type. However, if a particular project only happens to have files of one type, then the system may dynamically customize the browser panel for the current display. The further customized panel may offer extended command options applicable to the file type, or remove display areas and/or elements that normally would have been used to display files of other types. The browser views may be dynamically modified based on the identity of files that meet the criteria used to establish the panel. Other types of custom assembly may be performed. The browser may adjust the panels depending on the number of files to be displayed, so that a portion of a first display area's screen space may be transferred to a different display area (e.g., a smaller listview is shown, but a larger properties area is shown). The browser may adjust the panels based on the search criteria used to identify the files for display (e.g., the criteria may be incorporated into a predetermined portion of the display, or the results may be arranged based on the criteria and how well the files matched them).

In step 604, the browser view may be generated on a display device associated with the computer system. Then, in step 605, the system may check to determine whether the user has performed an interaction, or supplied an input, to the browser view. User interaction may include editing text, navigating through the pagespace by selecting a different view, and/or interacting with any of the displayed elements on the browser. If the user has given an input, then in step 606 the system may revise the browser in response. The revision to the browser may include removing, adding or modifying one or more of the displayed elements in the browser view, and may result in a dramatically different display. For example, the user viewing a Music browser view may select one of the music files and request to view a Project browser for a project associated with the selected music file—the Project browser may have a completely different display format. The browser displays may be dynamically modified to add and/or remove any of the features described above, which results in a browser interface that continuously provides users with a high level of contextually-appropriate information.

When changing or revising a particular browser, the system may provide visual effects to smooth the transition. For example, animation may be used to show a repositioning of a displayed element, fading can be used to show the addition/deletion of elements, and morphing effects may be used to show one element changing into another one. Although different views are possible, a user (or the system or its applications) may also specify that certain features (e.g., display elements, available commands, menus, etc.) or formats are to remain constant in multiple browser views, to help minimize user confusion.

In step 607, which occurs after step 606, or if no user input has been received in step 605, the system may check to determine whether the browser is to be closed, or left, and if so, the browser process for this browser may end. If not, the process may return to step 605 to await further user input.

Figure 7:
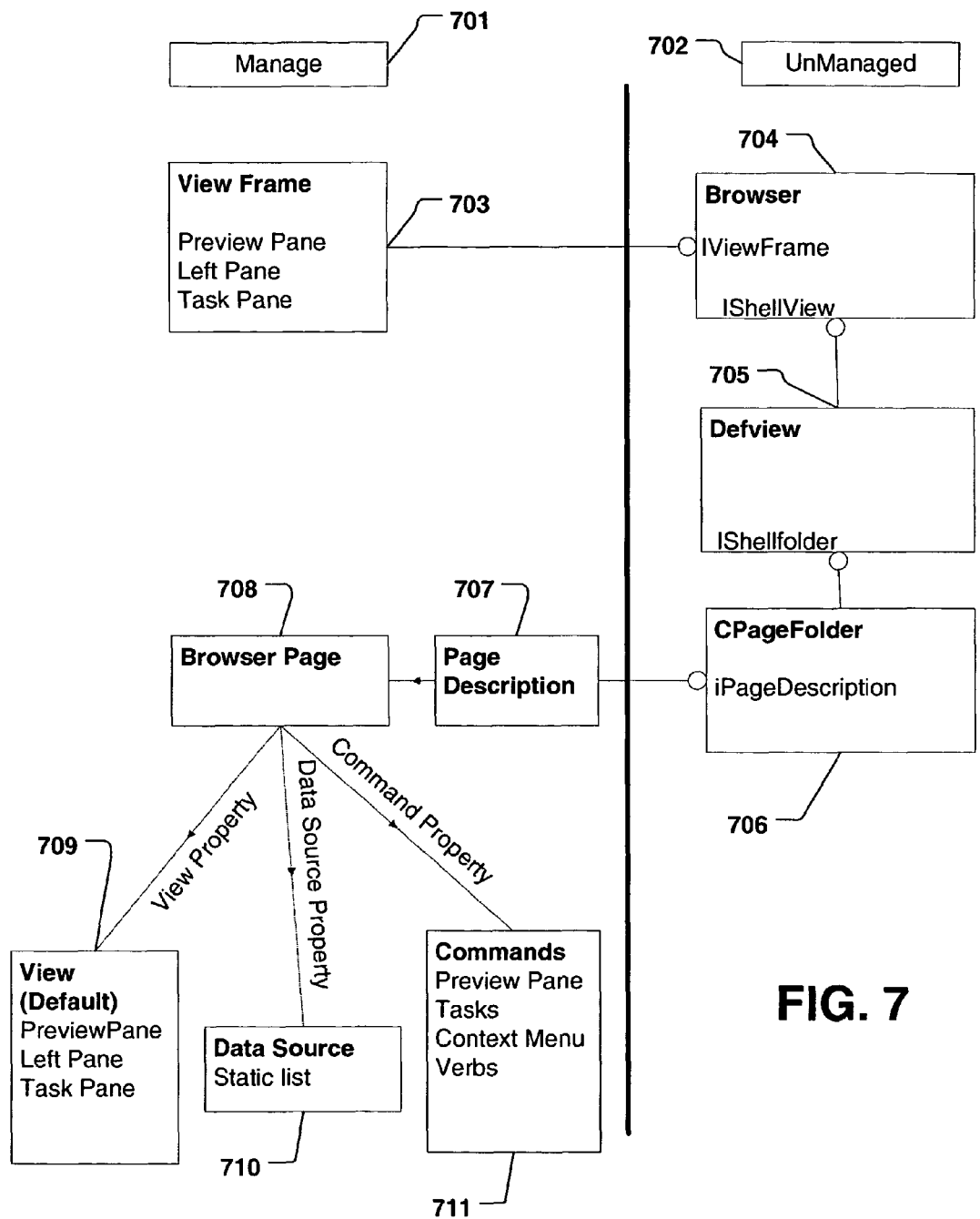
FIG. 7 depicts an example logical relationship among data structures, applications, and/or subroutines that may be used to implement aspects of the present invention.

FIG. 7 illustrates an example diagram of logical relationships that may exist in the system to generate the various browser views described above. Browser views may generally be managed by an underlying operating system (e.g., the Managed 701 group on the left of FIG. 7), or they may be unmanaged by the operating system so that individual post-installation applications may control the views (e.g., the Unmanaged 702 group on the right of FIG. 7). The system may define a basic overall view frame 703, which may define aspects that will be common to multiple views. For example, the basic view frame 703 of the system may include a preview pane, a left pane and a task pane. The basic configuration may be passed (e.g., as a data structure) to an unmanaged browser application 704, which may in turn call a default view routine 705 to generate a desired default browser view for the browser application 704. The application may include a subroutine 706 used to initiate the browser view, and that routine 706 may make access a managed data structure containing a page description 707 that defines the view to be generated for that particular browser application 704.

The page description 707 may include a reference to a browser page structure 708. The browser page 708 structure may include a variety of properties that ultimately define the view. For example, there may be a view property 709 defining the basic attributes to be contained in this view (those attributes may be the same preview pane, left pane and task pane in the basic view frame 703. The page 708 may also have a data source property 710, which may identify a location from which the data that populates the particular view may be obtained. The source 710 may, for example, include a static list of data. The page 708 may also include a command property 711, which may identify the various commands that are to be supported by the view. Each command may be implemented by a separate application and/or routine, and may include commands for handling preview pane tasks, context menu options, etc. Of course, the above is just one example of how the various browser views may be managed and implemented.

The discussion above refers to "browsers," but the features described herein need not be limited to system shell browsers. Any application wishing to offer customized views of data files may take advantage of the features described herein.

Alternative embodiments and implementations of the present invention will become apparent to those skilled in the art to which it pertains upon review of the specification, including the drawing figures. For example, the various steps in the described processes may be rearranged, modified, and/or deleted as desired to implement a selected subset of features described herein. Additionally, in the above, references to certain features being found in one or more "aspects" or "embodiments" of "the present invention" are made simply to illustrate various concepts that may be advantageously used alone or in combination with other concepts, and should not be read to imply that there is only one inventive concept disclosed herein, or that all of the described features are required in any of the claims that follow. Rather, each of the following claims stands as its own distinct invention, and should not be read as having any limitations beyond those recited.

What is claimed is:

1. A method for browsing files, comprising the steps of:
receiving a request to view files of a first file type in a file browser;
automatically identifying one or more files of the first file type;
selecting, by a computing device automatically without user interaction, from a plurality of predefined browser views for use in listing files of different predetermined file types, a predefined browser view that includes one or more display characteristics that are optimized for displaying the identified one or more files of the first file type, wherein the predefined browser view is selected based on characteristics of the identified one or more files of the first file type; and
outputting for display by a computing device automatically without user interaction said selected file browser view with information describing the identified the one or more files of the first file type.

2. The method of claim 1, wherein said one or more display characteristics comprise a set of user commands.

3. The method of claim 2, wherein said set of user commands comprise at least one command that is only included in the predefined browser view.

4. The method of claim 1, further comprising receiving an additional request to display a second file type and selecting, by the computing device, from the plurality of predefined browser views for use in listing files of different predetermined file types, a different predefined browser view that includes the one or more display characteristics that are optimized for display of the second file type.

5. The method of claim 1, wherein said one or more display characteristics comprise display areas that are different from those associated with other predefined browser views.

6. The method of claim 5, wherein said different display areas differ in size.

7. The method of claim 1, further comprises receiving a user instruction to modify the one or more display characteristics associated with the predefined browser view and updating the predefined browser view in response.

8. The method of claim 1, wherein the one or more display characteristics comprise property values for the first file type.

9. The method of claim 7, wherein the instructions further comprises reordering a sequence of property values for the first file type of said predefined browser view based.

10. A computer-storage medium having stored thereon computer-executable instructions for performing operations comprising:
automatically identifying one or more files of a first file type;
providing by a computing device automatically without user interaction a first browser view when browsing files of the first file type, the first browser view including a first set of available user commands, wherein the first browser view is selected based on the characteristics of the identified files of a first file type;
automatically identifying one or more files of a second file type; and
providing by the computing device automatically without user interaction a second browser view when browsing files of a second file type, the second browser view including a second set of available user commands that is different from the first set of available user commands, wherein the second browser view is selected based on the characteristics of the identified files of a second file type.

11. The computer-storage medium of claim 10, wherein said first file type includes files belonging to a first project.

12. The computer-storage medium of claim 10, wherein said first file type is a music file type.

13. The computer-storage medium of claim 10, further comprising computer-executable instructions for performing the steps of:
receiving a user request to view files meeting one or more criteria in a file browser;

identifying by the computing device automatically without user interaction a plurality of files that meet said criteria and are of a first type;

selecting by the computing device automatically without user interaction the first browser view from one of a plurality of predefined browser views based on the first browser view including one or more display characteristics that are optimized for displaying the identified files of the first type; and outputting for display by the computing device the plurality of files within the first browser view.

14. The computer-storage medium of claim 13, wherein said plurality of predefined browser views includes distinct browser views for use in listing files of different predetermined file types.

15. The computer-storage medium of claim 13, wherein said plurality of predefined browser views offer different display characteristics.

16. The computer-storage medium of claim 15, wherein said plurality of predefined browser offer different information for different file types.

17. A computer-storage medium having stored thereon computer-executable instructions for performing operations comprising:

providing an interface for a user to generate a plurality of file browsing views that are optimized for different file types;

receiving a request to display a set of files of a first file type;

automatically identifying one or more files of the first file type;

providing by a computing device automatically without user interaction a first browser view to browse files of the first file type, the first browser view including a first set of available user commands, wherein the first browser view is provided based on characteristics of the identified one or more files of the first file type;

receiving an additional request to display a set of files of a second file type;

automatically identifying one or more files of the second file type; and providing by the computing device automatically without user interaction a second browser view when browsing files of the second file type, the second browser view including a second set of available user commands that is different from the first set of available user commands, wherein the second browser view is provided based on characteristics of the identified one or more files of the second file type.

18. The computer-storage medium of claim 17, wherein said first file type is a music file type.

19. The computer-storage medium of claim 17, wherein said second file type is a picture file type.

20. The computer-storage medium of claim 17, wherein said first browser view comprises a first set of file information that is different from a second set of file information provided in the second browser view.

\* \* \* \* \*